United States Patent [19]
Wurz

[11] Patent Number: 6,022,392
[45] Date of Patent: Feb. 8, 2000

[54] DROPLET SEPARATOR

[75] Inventor: Dieter Wurz, Baden-Baden, Germany

[73] Assignee: Munters Euroform GmbH, Aachen, Germany

[21] Appl. No.: 09/037,583

[22] Filed: Mar. 10, 1998

[51] Int. Cl.[7] .................................................. B01D 45/08
[52] U.S. Cl. .................................. 55/422; 55/442; 55/443
[58] Field of Search .............................. 55/422, 307, 308, 55/436, 442, 443, 444, 445; 96/390, 392, 393; 95/267

[56] References Cited

U.S. PATENT DOCUMENTS

| | | | |
|---|---|---|---|
| 2,087,789 | 7/1937 | Allardice | 55/422 |
| 2,833,373 | 5/1958 | Custer | 55/442 |
| 3,550,357 | 12/1970 | Bowen et al. | 55/442 |
| 4,145,195 | 3/1979 | Knappstein et al. | 55/436 |
| 4,854,950 | 8/1989 | Kierzkowski et al. | |
| 4,891,052 | 1/1990 | Belin et al. | 55/444 |
| 5,230,725 | 7/1993 | Chowaniec | |

FOREIGN PATENT DOCUMENTS

| | | |
|---|---|---|
| 0 747 107 | 12/1996 | European Pat. Off. |
| 34 34 133 | 1/1986 | Germany |
| 1 546 776 | 5/1979 | United Kingdom |

*Primary Examiner*—Duane S. Smith
*Attorney, Agent, or Firm*—Herbert Dubno

[57] ABSTRACT

A droplet separator including a plurality of droplet separating members configured for the formation of packs which are disposed at a supporting structure. The packs are connected to the supporting structure in an upwardly tiltable manner. Accordingly, the droplet separator can be inspected and manually cleaned in a simple manner even with closest space conditions.

9 Claims, 2 Drawing Sheets

DROPLET SEPARATOR

SPECIFICATION

FIELD OF THE INVENTION

The present invention is directed to a droplet separator including a plurality of droplet separating members configured for the formation of packs which are disposed at a supporting structure.

BACKGROUND OF THE INVENTION

Washing towers are used for the desulphuration of flue gases. In order to prevent the escape of washing liquid droplets together with the cleaned flue gas, droplet separators are installed towards the outlet of the washing tower, sometimes also in a special housing downstream of the washing tower. For example, a typical configuration according to which flue gas and washing liquid are directed in cross-flow has a two-stage droplet separator. The content of solid matter of the droplets trapped by the droplet separator remains adhered to the surface of the separator with a certain percentage and can result there in an incrustation affecting the function. In order to avoid encrustation droplet separators are provided with a spray cleaning system.

At first, washing towers were provided with only one droplet separator stage. However, soon one had to recognize that a second droplet separator stage was necessary for substantially avoiding the escape of droplets disturbing the operation of following components, such as blowers or heaters for the purified gas. Meanwhile, long term operational experiences show that an even stronger reduction of the droplet output of the washing tower makes economic sense. Thus, repair costs of the following components can be avoided which can easily reach ten times the installation costs for a third droplet separator stage. Furthermore, the emission of coarse particles with the flue gas is strongly reduced since a reduced droplet content in the purified gas is connected with a reduced input of solid matter into the tract of the purified gas is connected. The emission of frequently corrosive coarse particles (d>0.5 mm) together with the flue gas resulted in substantial claims of compensation at some places.

With new installations the arrangement of a third droplet separator stage does not cause fundamental problems and can be realized with little additional cost. However, with old installations the third droplet separator stage can only be connected with very high costs. In many cases it can be only realized with low costs by an extreme compact construction. However, it is necessary to inspect the droplet separators from time to time. On account of this reason in the past the droplet separators were installed with a distance from one another sufficient for the access of the intermediate space. In this intermediate space the cleaning nozzles for the droplet separator are disposed.

However, in many cases the available space for the installation of a third droplet separator stage is so small that the principle of "accessibility of the intermediate space" has to be given up or very high costs for an extensive reconstruction of the washer head or for the installation of a special droplet separator housing have to be accepted.

OBJECT OF THE INVENTION

It is the object of the present invention to provide a droplet separator of the cited kind which has a compact construction and which can be inspected and manually cleaned in a simple manner even with closest space conditions.

SUMMARY OF THE INVENTION

According to the invention this problem is solved with a droplet separator of the cited kind by the feature that the packs are connected to the supporting structure in an upwardly tiltable manner.

The invention avoids the need for removal of the droplet separator packs of the respective stage for inspection or cleaning and the need for reassembly thereafter. Accordingly, substantial personnel costs and time are saved and the risk of damaging the droplet separators is avoided. The invention provides a configuration which is favorable with respect to maintenance and which does not have the cited disadvantages.

According to the invention the packs of the droplet separating members are connected to the supporting structure in an upwardly tiltable manner. Accordingly, they have a substantially horizontal or slightly inclined position of operation and an upwardly tilted position of inspection, maintenance or cleaning. So the droplet separator packs can be inspected and, if necessary, cleaned without removal, which is necessary otherwise.

According to a feature of the invention the packs are disposed at upwardly tiltable supports. These supports, for instance, can be frames or base plates at which or in which the droplet separator packs are disposed. Other embodiments of supports are also possible. The provision of supports assures a simple handling for the upward and downward tilting.

The upward and downward tilting of the droplet separator packs or of the supports provided herefor can be realized manually or in a motor-driven manner. In the second case appropriate drive means (control motors) are provided which move the packs or supports. Such drive means are known to the expert in the art and need not be explained in detail here.

A special embodiment of the invention is characterized by the feature that the droplet separating members of one pack are inserted through recesses in the base plate adapted to the droplet separator profile and are connected to the plate on the outside of the same.

The packs and/or the supports thereof are appropriately connected to the supporting structure by means of hinges. Accordingly, the packs or the supports thereof can be tilted upwardly and downwardly in a simple manner.

According to an improvement of the invention the packs and/or the supports thereof are carried or supported by consoles. These consoles are appropriately formed or disposed in such a manner that they carry or support the packs and/or their supports not only in the position of operation but also in the upwardly tilted position. In other words, the packs or their supports are supported at one end at the one console in a pivotable or tiltable manner and are supported with the other end at the adjacent console in the position of operation. In the upwardly tilted position they are preferably supported at the one console at which they are supported.

The packs and/or their supports are appropriately tilted upwardly so far that they form an angle of more than 90° with a horizontal line in the upwardly tilted position, i.e. that they are inclined slightly backwardly. Accordingly, they can be inspected and, if necessary, cleaned especially well. In this upwardly tilted condition, if consoles are present, they preferably are in contact with the outsides thereof. A suitable angle of inclination is 110°, for instance.

Preferably, the packs and/or their supports are inclined with respect to a horizontal line also in the position of operation. A preferred angle of inclination is in a range of 10–60°. This inclined arrangement has the advantage that there is still sufficient space for the installation of droplet separator nozzles between the supporting structure and the droplet separator packs, not only for the upstream cleaning of the packs but also for the downstream cleaning of a pre-arranged droplet separator stage, if such a stage is present. Furthermore, the arrangement inclined with respect to a horizontal line offers advantages with regard to process technology since it allows higher flow velocities and it is less susceptible with respect to incrustations.

Accordingly, in this embodiment the droplet separator packs are disposed in the form of a shed roof.

The droplet separator which is formed according to the invention has a suitable supporting structure including the above-mentioned consoles or at which the consoles are disposed. This supporting structure can be, for instance, a carrier or bearing construction which is specially formed for the droplet separator. However, the supporting structure can be also formed by an additional droplet separator stage. In the last mentioned case the droplet separator comprises a conventionally formed droplet separator stage, for instance, on which the droplet separator according to the invention is formed with a relatively slight distance therefrom. An additional supporting structure for the inventive droplet separator is then no longer necessary. It is an advantage that the inventive droplet separator can be arranged with a relatively slight distance from the existing droplet separator stage so that existing narrow space conditions can be taken into account.

Practically, the droplet separator formed according to the invention is a light construction. This is especially advantageous for the subsequent installation of the droplet separator, for instance, for static reasons.

A very important aspect with great advantages with respect to the costs for the post-installation of a droplet separator is in the feature to design the droplet that no hot connection techniques (hot welding) have to be used within the scrubber. Accordingly, the droplet separator formed according to the invention is advantageously adapted to be assembled or to be mounted in existing scrubber installations by cold connection techniques. Thus, the installation of a fire protection wall for the mounting of the droplet separator is not necessary. So the costs for the post-installation of a droplet separator stage can be substantially reduced.

BRIEF DESCRIPTION OF THE DRAWING

In the following the invention is discussed in detail by means of an example in connection with the accompanying drawing, in which.

SPECIFIC DESCRIPTION

Figure 1:
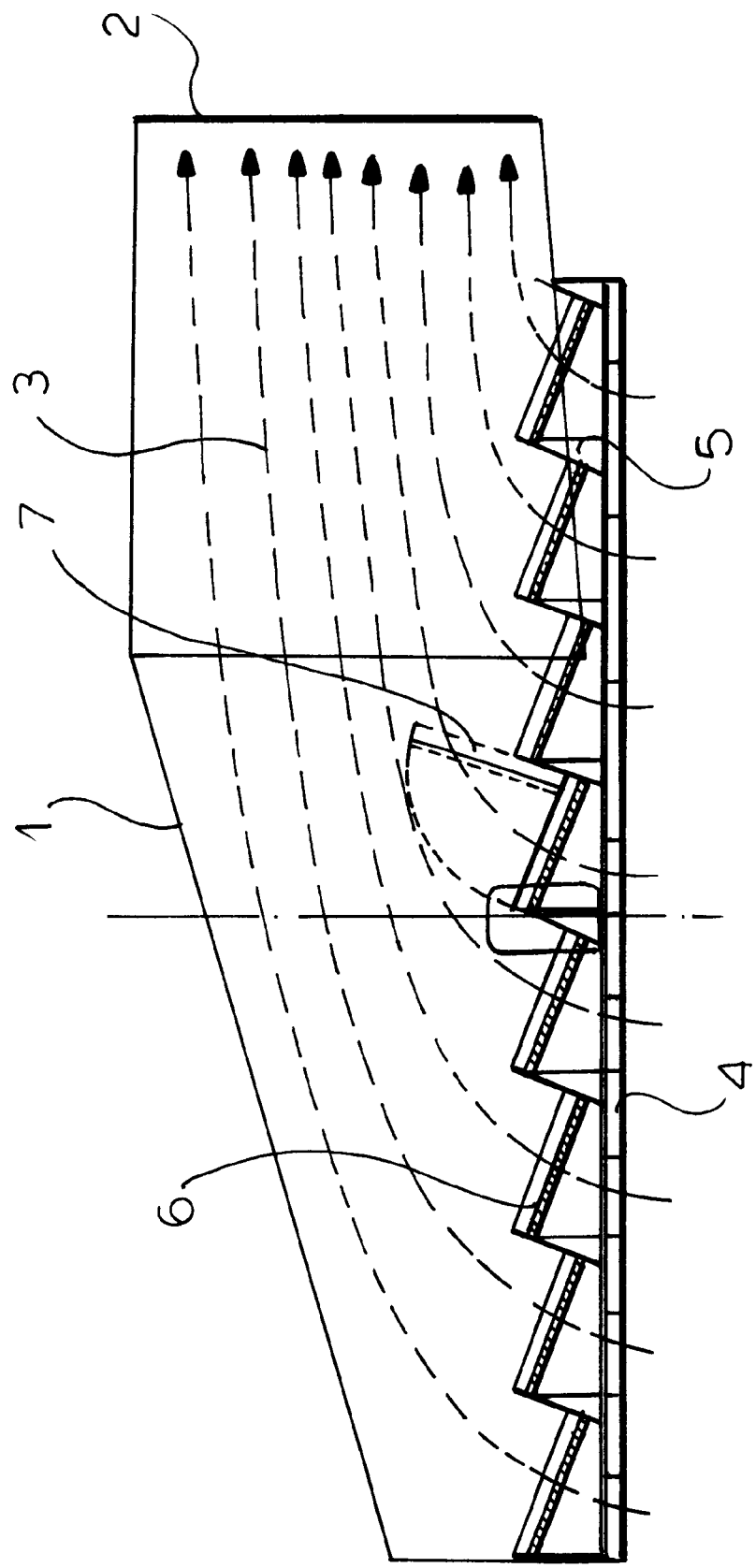
FIG. 1 shows schematically the washer head of a power station washing tower with installed droplet separator in a lateral view.

The washer head of a power station washing tower for desulfuration shown in FIG. 1 has a flue gas channel in is which the flue gas which is to be washed flows upwardly and then in the figure to the right into a channel 2 for purified gas. The flow direction of the flue gas is indicated at 3. On its way the flue gas passes several spraying levels (not shown) as well as several droplet separator stages of which a third stage is shown. While the lower two droplet separator stages are stationarily formed in a conventional manner, the third stage is formed according to the invention and includes droplet separator packs which are connected to the associated supporting structure in an upwardly tiltable manner. A corresponding supporting structure is shown at 4. This supporting structure can be a special supporting structure but also the droplet separator stage which is provided thereunder.

As one can see from FIG. 1, consoles 5 are disposed at intervals on the supporting structure 4. These consoles are substantially triangulary formed in cross-section. Droplet separator packs 6 are mounted at these consoles in an upwardly tiltable manner. A droplet separator pack in the upwardly tilted condition is shown at 7. The droplet separator packs 6 are in inclined positions with respect to a horizontal line in their position of operation. In this position they are supported at the upper end of a respective console 5. In the upwardly tilted condition, as shown at 7, they engage the inclined side of the triangular console 5 and are supported thereby too.

Figure 2:
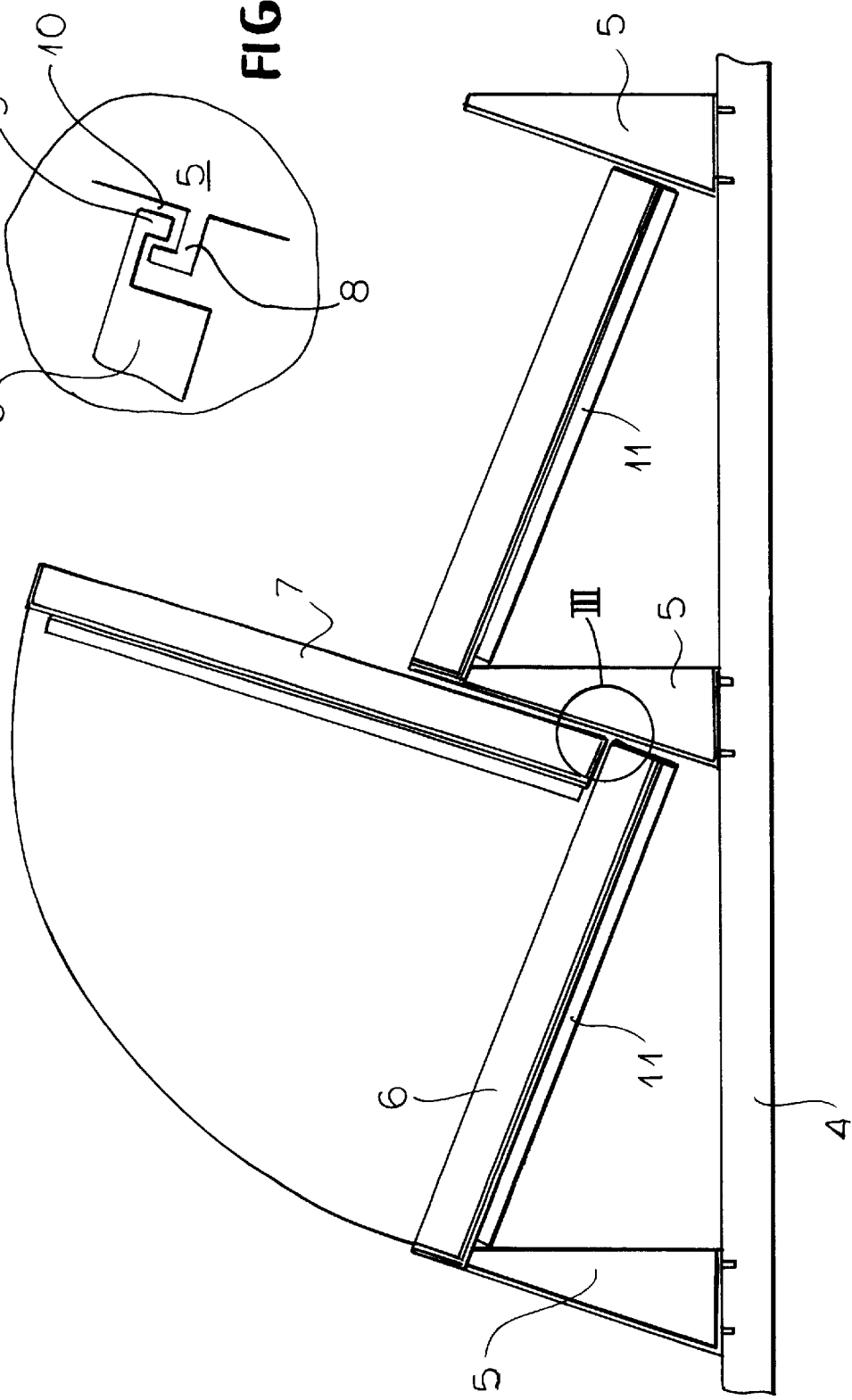
FIG. 2 an enlarged representation of a part of the droplet separator of FIG. 1.
Figure 3:
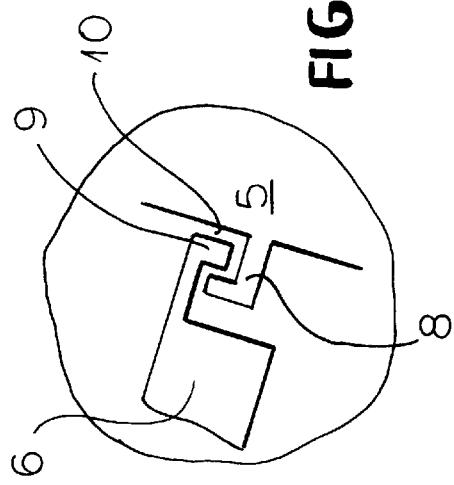
FIG. 3 the detail shown in the dotted circle of FIG. 2.

FIGS. 2 and 3 show the exact construction of the droplet separator in detail. As shown in FIG. 3, projecting ledges 8 are disposed at the inclined sides of the consoles 5 and form a hinge together with the projecting ledges 9 of the droplet separator packs 6. The ledges 9 engage into a pan 10 and thus can be manually tilted upwardly into the position shown at 7 in a simple manner. In this position the packs are supported at the inclined sides of the consoles.

Corresponding nozzle means can be disposed between the supporting structure 4 and the droplet separator packs 6.

The construction which is shown here is a light construction consisting of plastics. The connections between the several parts are realized by means of screws.

According to this example the droplet separator packs 6 are directly connected to a base plate 11, for instance by pasting or welding. Also the support ledge 9 by means of which the droplet separator pack is supported within the pan 10 is disposed at this base plate. The base plate is provided with recesses corresponding to the droplet separator profile. The respective lamellas are inserted through the recesses and are welded on the outside before the packs are inserted into the washing tower.

According to an alternative embodiment of the invention the packs and/or their supports are leaned against a supporting construction with openings the openings of which are closed by removable or pivotable plates. The support construction is preferably formed in an inclined manner.

I claim:

1. A droplet separator comprising:
 a supporting structure;
 a plurality of horizontally spaced consoles on said supporting structure; and
 a plurality of droplet-separating-member packs traversable by gas in which droplets are entrained for removing droplets from the gas, said packs each being tiltably mounted on a respective one of said consoles and resting on another of said consoles in a droplet-separating operating position of the pack, whereby said packs are spaced apart on said supporting structure, said packs being swingable into inoperative upwardly tilted positions wherein said packs are supported by surfaces of the respective said one of said consoles.

2. The droplet separator defined in claim 1 wherein each of said packs comprises a respective frame or base plate and a multiplicity of separating members affixed to the respective frame or base plate.

3. The droplet separator defined in claim 2 wherein said members are insertable through recesses in the respective base plate adapted to a configuration of the respective member and the members are connected to the base plate on an outside thereof.

4. The droplet separator defined in claim 1, further comprising a respective hinge between each of said one of said consoles and the respective pack.

5. The droplet separator defined in claim 1 wherein said packs in said inoperative upwardly tilted positions form angles in excess of 90° with a horizontal line.

6. The droplet separator defined in claim 1 wherein said packs in said operating positions are inclined to a horizontal line.

7. The droplet separator defined in claim 1 wherein said consoles support said packs at a distance from said supporting structure sufficient to accommodate a spraying device in said packs and said supporting structure.

8. The droplet separator defined in claim 1 where in said supporting structure a droplet separator having stationarily arranged droplet separating members.

9. The droplet separator defined in claim 1 wherein the droplet separator is assembled with cold connections.

* * * * *